Sept. 29, 1942.   G. L. LARISON   2,296,858
COMBINED TRUCK AND TRAILER
Filed May 19, 1941   2 Sheets-Sheet 1
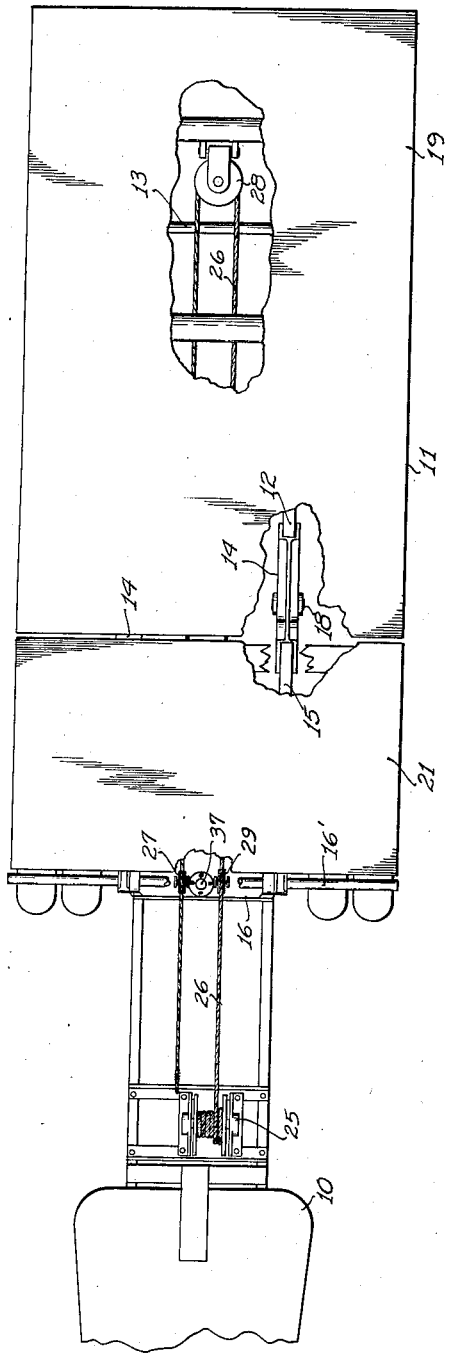
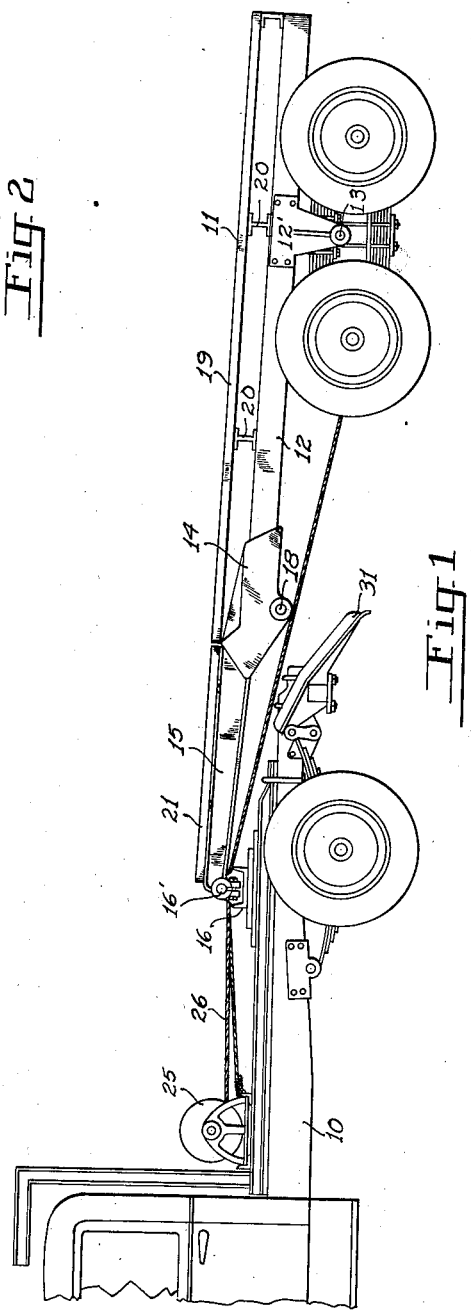
GLENN L. LARISON
INVENTOR
BY
ATTORNEYS

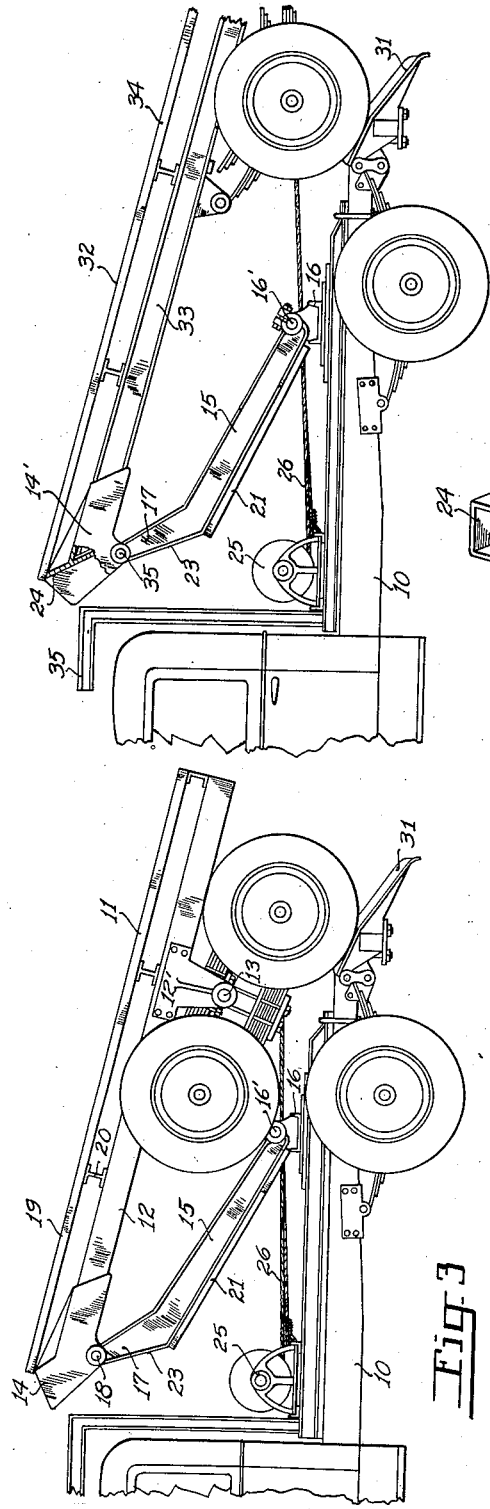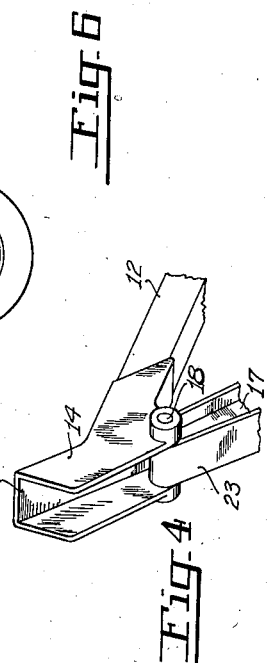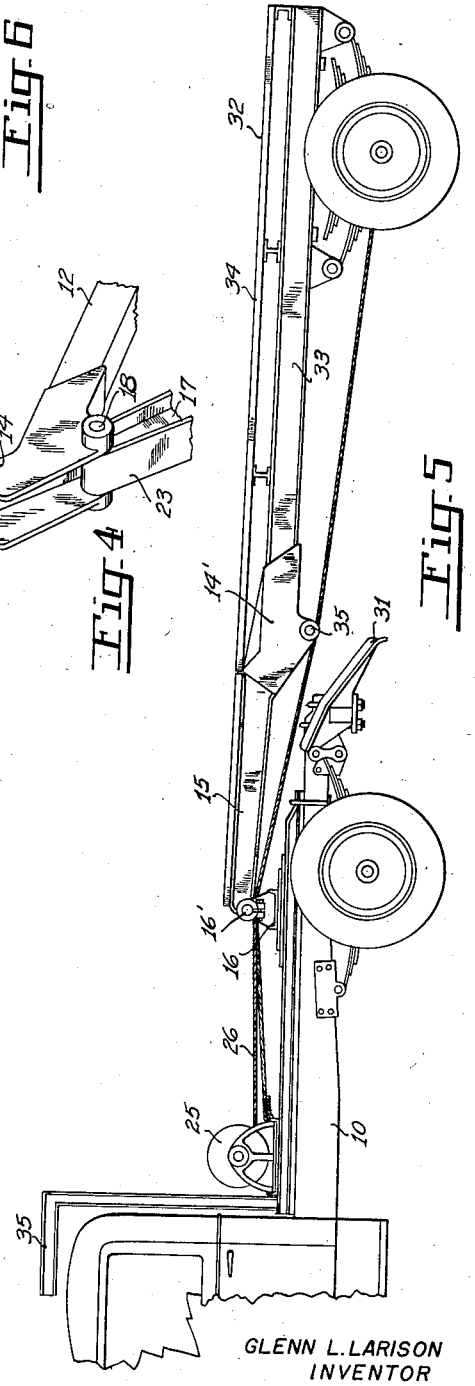

Patented Sept. 29, 1942

2,296,858

UNITED STATES PATENT OFFICE 2,296,858

COMBINED TRUCK AND TRAILER

Glenn L. Larison, La Grande, Oreg.

Application May 19, 1941, Serial No. 394,152

6 Claims. (Cl. 214—85)

This invention relates in general to a truck and trailing vehicle connected thereto, and, more specifically, to a trailer attached to a truck by a foldable connection adapted to facilitate the loading of the trailer onto the truck whenever it is desired to carry the trailer on the truck.

In particular, this invention relates to a trailer and a truck equipped with trailer loading means similar to that described in my United States Letters Patent No. 2,112,201, issued March 22, 1938, and entitled "Means for loading a trailer onto a truck," to which patent reference is to be made, and this present invention involves certain improvements in the trailer and truck described in my said patent, particularly in the construction of the trailer frame and the connection between trailer and truck.

An object of this invention is to provide a trailer of the flat bed type, such as that generally used for holding lumber and other commodities, in which a maximum flat bed space or top surface area is possible, but which, nevertheless, may be loaded on the truck as easily as the logging trailer shown in my above-mentioned patent.

Another object of this invention is to provide a connection between trailer and truck which will take the place of the ordinary trailer tongue or reach, and which will constitute an extension of the frame and flat bed of the trailer when the trailer is not loaded on the truck.

A further object of this invention is to provide a frame connection between trailer and truck which will accomplish the previously-stated object but which can be permanently attached to both truck and trailer and which, when used in conjunction with my trailer loading means, will enable the driver of the truck to load the trailer onto the truck and unload the trailer from the truck without getting out of the driver's cab on the truck.

These and other objects I attain by constructing my trailer, truck, connecting frame, and trailer loading means, in the manner hereinafter briefly described with reference to the accompanying drawings.

In the drawings:

Figure 1 is a fragmentary side elevation of the truck and trailer, showing the trailer in trailing position and ready for hauling cargo;

Figure 2 is a top plan view of the truck and trailer of Figure 1;

Figure 3 is a fragmentary side elevation of the same truck and trailer but showing the trailer in loaded position on the truck;

Figure 4 is a view in perspective, and drawn to a larger scale, illustrating one of the hinge elements in the connecting frame between trailer and truck;

Figure 5 is a fragmentary side elevation of a truck and an attached trailer in trailing position, similar to Figure 1, but showing my invention used with a single axle trailer in place of the dual axle trailer of Figure 1; and Figure 6 is a fragmentary side elevation of the truck and single axle trailer of Figure 5, but showing the trailer loaded upon the truck.

Referring first to Figures 1, 2 and 3, the truck and trailer are indicated in general by the reference characters 10 and 11 respectively. The trailer 11, illustrated in these figures, is of the dual axle type, being similar to that commonly employed in heavy-duty trailers and similar vehicles. The trailer primary bed frame includes a pair of longitudinal members 12 pivotally supported through the medium of hangers or brackets 12' on the transverse shaft 13, which permits tilting of the trailer body in either direction. On the longitudinal members 12 may be mounted lumber rolls or the flat bed or deck 19 of the trailer, the flat bed 19, as shown, being supported on a series of suitable transversely-extending I beams 20 which in turn are supported on the longitudinal members 12.

A hinge member 14 is secured to the forward end of each of the longitudinal members 12, and a second longitudinally-extending frame member 15, pivotally mounted on the hinge pintle 18, is connected by the hinge to each longitudinal member 12. The shape and construction of the hinge members 14 can be seen more clearly in Figure 4. Each of the second longitudinal members 15 is preferably shaped with its section 17, adjacent the hinge, arranged so as to form an obtuse angle with the main section, and this end section 17 has a bearing surface 23 (see Figures 3 and 4) which is adapted to rest against the oblique inside surface 24 of the forward cap-like portion of the hinge 14, when the trailer is arranged in the trailing position shown in Figure 1, thus limiting the movement of the hinged members downwardly and holding the pairs of longitudinal frame members 15 and 12 substantially parallel.

The two forward longitudinal members 15 form part of a secondary frame on which may be mounted lumber rolls or a bed or deck 21, similar to the corresponding bed or deck 19 of the trailer, of the same width as the trailer deck (as shown in Figure 2), and arranged with the top surface at the same level (as shown in Figure 1), so that the two beds or decks 19 and 21 will cooperate to form a continuous deck or bed as long as the trailer 11 is in trailing position.

A transversely-extending bunk or support 16 is mounted on the truck by means of a central pivot 37 (see Figure 2), which permits the bunk or support 16 to pivot in a horizontal plane on suitable bearing supports on the truck. A transverse shaft 16' is carried by the support or bunk 16 and the forward ends of the longitudinal frame members 15 are attached to the shaft 16', as shown in Figure 1, so as to form a hinge connection between the members 15, and the frame of which they are a part, and the support or bunk 16.

To enable the trailer 11 to be loaded onto the truck, a runway or ramp 31 (see Figures 1 and 3) is attached to the rear of the truck, as described in my United States Patent No. 2,112,201, above-mentioned. A winch 25 is mounted on the truck behind the truck cab and is arranged to be driven by hand crank or by the truck motor in any suitable manner (for example as described in my previous patent above-mentioned). A cable 26 has one end attached to the truck near the winch and passes around a sheave 28 secured to the rear axle of the trailer (see Figure 2). This cable passes over suitable sheaves 27 and 29 on the bunk or support 16 and has its other end secured to the drum of the winch 25. The cable passes under the front axle of the trailer which, with the trailer as shown in Figure 1, holds the cable below the line of the hinge pintles 18. Operation of the winch 25, causing the end of the cable to wind up on the drum, will cause the trailer to be pulled towards the truck and the connecting frame to be swung upwardly and towards the truck in the same manner as would occur if the two vehicles were connected by a folding tongue. Continued winding of the cable by the section will cause the trailer and connecting frame to occupy the positions illustrated in Figure 3. In this position the trailer is entirely supported for being carried on the truck, with the front wheels of the trailer resting against the transverse shaft 16' on the support or bunk 16 and a pair of the rear wheels resting on the ramp 31. Unloading the trailer from the truck is accomplished simply by permitting the drum, on which the cable end is wound, to be rotated in opposite direction so as to unwind the cable, and allow the trailer slowly to roll backwards off of the truck and ramps, as described in my previously-mentioned patent.

In Figures 1, 2, and 3, I have illustrated my invention as applied to a dual axle trailer. In Figures 5 and 6 I show a single axle trailer 32, substituted for the dual axle trailer. In all other respects the construction is the same, the trailer having two longitudinal members 33 to which hinge members 14', similar to the hinge members 14 of Figures 1, 2, 3 and 4, are secured; and the trailer being connected to the truck by the same connecting frame.

With this latter trailer, however, I found it preferable to substitute a single transverse shaft 35, extending through both the hinge members 14', in place of the hingle pintles 18, in order that the cable 26 can be passed under the shaft 35 and will thus always be kept below the hinges 14'. Since there is no forward trailer axle for the cable to pass under, the cable might, in the case of a long single axle trailer, be stretched above the hinge joints. When the cable is kept below the hinges, the opening of the hinge joints, when the cable is wound by the winch so that the trailer may be pulled towards the truck, is facilitated.

In Figure 6 it will be observed that the trailer wheels rest in approximately the same position with respect to the ramps as the rear wheels of the trailer in Figure 3, the loading and unloading of the trailer onto and from the truck being accomplished in exactly the same manner as previously indicated.

It will be obvious that my invention may be employed with any type of wheel mounting used for either trailer or truck. It is necessary only that the location of the wheels of a single axle trailer, or the rear wheels of the dual axle trailer, be so arranged that they will rest in proper position on the truck, preferably on the ramps attached to the truck, when the trailer is loaded on the truck. It will also be obvious from Figure 3 that a longer trailer could be used, with the same truck and with the trailer frame extending further to the rear of the trailer wheels; and also, that if a longer connecting frame were employed, that is to say, if the members 15 were made longer, the trailer also could be made correspondingly longer. If the members 15 and the frame of the trailer were made longer, than shown in Figures 3 and 6, the hinged end of the trailer would extend over the top of the cab of the truck when the trailer is in loaded position, and in such case, a suitable guard, such as shown at 35, should be provided as a protection for the top of the cab. By increasing the length of the truck, the lengths of the trailer and connecting frame obviously could also be increased. In the drawings I have shown a comparatively small truck in combination with a trailer and connecting frame, the trailer and connecting frame furnishing a comparatively large load-carrying deck surface, and yet the entire combination of truck connecting frame and trailer occupy a relatively small space when the trailer is in loaded position on the truck. This is an important feature of my invention, namely the furnishing of a maximum load-carrying surface by a unit which is comparatively small when in folded position.

While I have described and illustrated the trailer and connecting frame as having a flat bed or deck, similar to ordinary freight hauling vehicles, this is not to be construed as limiting my invention, since lumber rolls such as are used to facilitate the loading or unloading of lumber, could be satisfactorily installed on the trailer and connecting frame. Also various other changes could be substituted in the deck of the trailer and connecting frame, and other modifications made in trailer connecting frame and truck, without departing from the principle of my invention.

I claim:

1. The combination of a truck, a trailer adapted to be towed by said truck, and a frame connecting said trailer with said truck, the rear end of said frame hinged to the forward end of said trailer, a hinged and pivotal connection for said frame on said truck, whereby said frame may be swung upwardly and folded over on said truck and whereby said truck may turn in a horizontal plane with respect to said frame, a freight-supporting bed on said trailer, a similar bed on said frame said frame bed being of substantially the same width as said trailer bed so as to constitute in effect a forward extension of said trailer bed when said trailer is in trailing position, means for holding the beds of said frame and said trailer in substantially the same plane when said trailer is in trailing position, an inclined runway secured to said truck and located rearwardly of the rear axle of said truck, means on said truck for drawing said trailer towards said truck and causing said frame to swing upwardly and be folded over on said truck until the wheels of said trailer have rolled up said runway and loaded said trailer onto said truck.

2. The combination of a truck, a trailer adapted to be towed by said truck, and a frame connecting said trailer with said truck, the forward end of said frame hinged to a pivotal mounting on said truck and arranged to be folded over on said truck when said trailer is loaded onto said truck, a freight-supporting bed on said trailer, a similar bed on said frame, said frame bed being of substantially the same width as said trailer bed so as to constitute in effect an extension of said trailer bed when said trailer is in trailer position, a hinge connection between said frame and said trailer, said hinge connection between said frame and said trailer adapted to hold said frame in a plane parallel to said trailer bed when said trailer is in trailing position but to permit said frame to be folded under the forward end of said trailer when said trailer is loaded onto said truck, and means for loading said trailer onto said truck, said means including an inclined runway at the rear of the truck and means on the truck for drawing said trailer towards said truck and a trailer wheel up said runway.

3. The combination of a truck, a trailer adapted to be towed by said truck, and a frame connecting said trailer with said truck, a freight-supporting bed on said trailer, a similar bed on said frame, said frame bed being of substantially the same width as said trailer bed, and arranged to extend at substantially the same level as said trailer bed so as to constitute in effect an extension of said trailer bed when said trailer is in trailing position, a hinge connection between said frame and said trailer, the forward end of said frame mounted on said truck and arranged to be folded over on said truck when said trailer is loaded onto the truck, means for holding the beds of said frame and said trailer in the same horizontal plane when said trailer is in trailing position, an inclined runway secured to said truck and located rearwardly of the rear axle of said truck, means on said truck for drawing said trailer towards said truck and causing said frame to swing upwardly and towards the front end of said truck until the wheels of said trailer have rolled up said runway and loaded said trailer onto said truck.

4. The combination of a truck, a trailer adapted to be towed by said truck, and a hinged frame connecting said trailer with said truck, a hinged and pivotal connection between said frame and said truck, whereby said frame may be swung upwardly with respect to said truck and said truck may turn in a horizontal plane with respect to said frame, said frame supporting a freight-carrying bed similar to the bed of said trailer and adapted to serve as an extension of the bed of said trailer when said trailer is being towed by the truck, a hinge connection between said frame and said trailer, said hinge connection between said frame and said trailer adapted to hold said frame in a plane parallel to said trailer bed when said trailer is in trailing position, an inclined runway secured to said truck and located rearwardly of the rear axle of said truck, means on said truck for drawing said trailer towards said truck and causing said frame to swing upwardly and towards the front end of said truck until the wheels of said trailer have rolled up said runway and loaded said trailer onto said truck.

5. In combination with a truck and a freight-carrying trailer adapted to be towed by said truck, a frame connecting said trailer with said truck, said frame hinged to the forward end of said trailer, a hinged and pivotal connection between said frame and said truck, whereby said frame may be swung upwardly with respect to said truck and said truck may turn in a horizontal plane with respect to said frame, said frame supporting freight-carrying means similar to the freight-carrying means on said trailer and adapted to serve as an extension of said trailer when said trailer is being towed by the truck, said hinge connection between said frame and said trailer adapted to hold said frame with its freight-carrying means in substantially the same plane as the freight-carrying means on said trailer when said trailer is in trailing position, and means for loading said trailer onto said truck, said means including an inclined runway at the rear of the truck and means on the truck for drawing said trailer towards said truck and a trailer wheel up said runway.

6. In combination with a truck and a trailer of the character described adapted to be towed by said truck, a hinged frame connecting said trailer with said truck, said frame supporting a freight-carrying bed similar to the bed of said trailer of approximately the same width as said trailer bed and adapted to serve as an extension of the bed of said trailer when said trailer is being towed by the truck, a hinge connection between the rear end of said frame and said trailer, the forward end of said frame hinged to a mounting on said truck and arranged to be folded over on said truck when said trailer is loaded onto the truck, means for holding the beds of said frame and said trailer in the same plane when said trailer is in trailing position, and means for loading said trailer onto said truck, said means including an inclined runway at the rear of the truck and means for causing said frame to be folded over on said truck and said trailer to be drawn towards said truck and up said runway.

GLENN L. LARISON.